No. 644,487. Patented Feb. 27, 1900.
E. ZUMKELLER.
WATER METER.
(Application filed May 28, 1898.)
(No Model.)
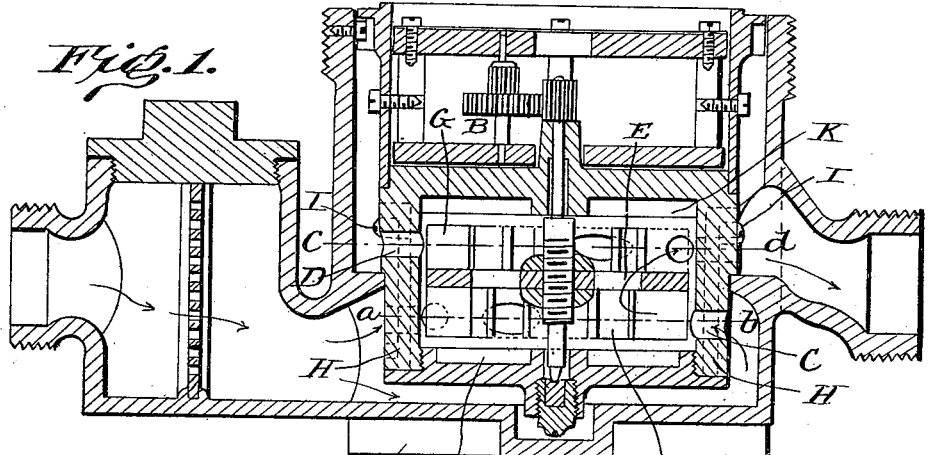
Fig. 1.
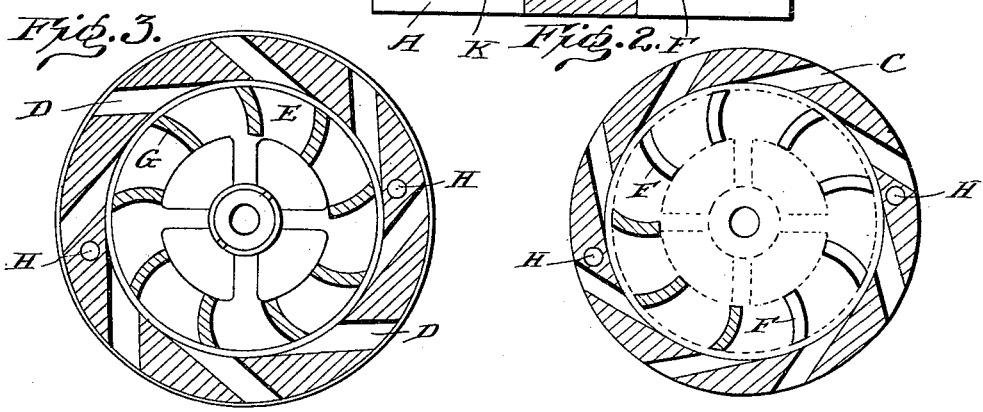
Fig. 3.   Fig. 2.
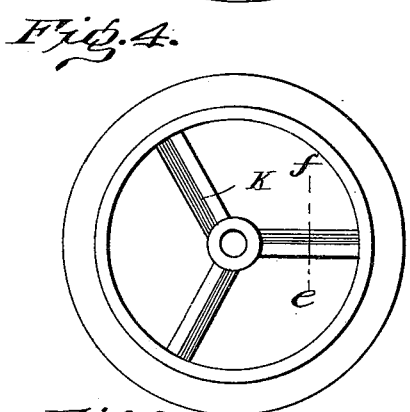
Fig. 4.
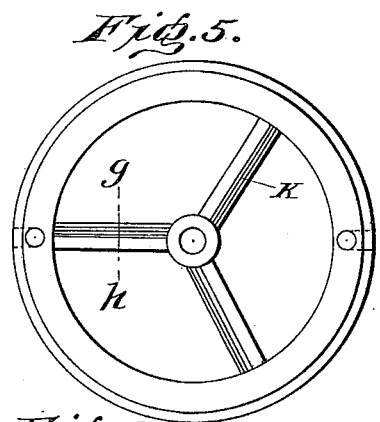
Fig. 5.
Fig. 7.
Witnesses:
Fig. 6.
Inventor
Emil Zumkeller
By James L. Norris
Attorney

UNITED STATES PATENT OFFICE.

EMIL ZUMKELLER, OF LUDWIGSHAFEN, GERMANY, ASSIGNOR TO FRIEDRICH LUX, OF SAME PLACE.

WATER-METER.

SPECIFICATION forming part of Letters Patent No. 644,487, dated February 27, 1900.

Application filed May 28, 1898. Serial No. 682,059. (No model.)

*To all whom it may concern:*

Be it known that I, EMIL ZUMKELLER, residing at Ludwigshafen-on-the-Rhine, in the Kingdom of Bavaria and German Empire, have invented a certain new and useful Improvement in Water-Meters, (for which I have filed applications for Letters Patent as follows: in Germany on November 13, 1897, No. Z. 2,469 11/42; in Great Britain on May 2, 1898, No. 10,043; in Denmark on May 3, 1898, No. 487; in Sweden on May 4, 1898, No. 762; in Norway on May 5, 1898, No. 9,772; in France on May 5, 1898, No. 265,438; in Austria on May 7, 1898; in Hungary on May 10, 1898, No. 6,701, and in Belgium on May 10, 1898, No. 105,790,) of which the following is a specification, reference being had to the accompanying drawings.

This invention consists in the vane-wheel water-meter hereinafter described and claimed, which is capable of measuring water flowing through it in the direction opposed to that of the usual flow, the construction and arrangement of parts being such that the passages provided in the walls of the measuring-cylinder are arranged horizontally one above the other and are of the same size, but run in opposite directions, while upon both the bottom and top cover-plates of the cylindrical measuring vessel are provided stemming or damming ribs of triangular cross-section so arranged that water flowing in from below strikes against their vertical faces, while water flowing in from above strikes against their inclined faces, in consequence of which the vane-wheel in spite of being more heavily loaded with the water flowing in the backward direction yet makes exactly the same number of revolutions, only in the reverse direction, for each unit of measurement of water flowing backward as for each unit flowing in the forward direction.

In the accompanying drawings, Figure 1 is a vertical section through a water-meter constructed in accordance with my invention. Fig. 2 is a horizontal section upon the line *a b* of Fig. 1 through the cylinder and the vane-wheel, as seen from above. Fig. 3 is a horizontal section on the line *c d* of Fig. 1 through the cylinder and the vane-wheel. Fig. 4 is a plan view of the bottom plate closing the lower end of the cylindrical measuring vessel. Fig. 5 is a plan view showing the top plate of the cylindrical measuring vessel. Fig. 6 is a detail sectional view on the line *g h*, Fig. 5; and Fig. 7 is a similar view on the line *e f*, Fig. 4.

In order to enable those skilled in the art to make and use my invention, I will now describe the same in detail, reference being made to the accompanying drawings, in which—

The letter A indicates the outer metal meter-casing, having at one side the water-inlet A' and at the opposite side the water-outlet $A^2$. In the top part of the casing is arranged a frame or inner case B, designed to contain any suitable counting or registering mechanism adapted to be operated in any well-known manner by the central vertical shaft B' of the vane or water wheel hereinafter described. Inasmuch as the counting or registering mechanism may be of any known type operated as usual, I do not deem it necessary to describe or illustrate the same in detail. In the lower part of the outer casing is arranged the cylinder $B^2$ of the measuring vessel, having in its sides two sets of lateral water-passages C and D, arranged in opposite directions, as seen in Figs. 2 and 3, and one set being above the other, as seen in Fig. 1. The arrangement of the water-passages C and D should be such that, assuming the vane or water wheel, hereinafter described, to be absent, the water entering the lower passages, for example, will issue through the upper passages without diverging from its tangential direction, and conversely.

The vane or water wheel rotating in the cylindrical measuring vessel consists of an annular disk E, provided both above and below with curved vanes or scoops F and G, the hollow and concave side of which is directed toward the water-inlet in each case. The vanes or scoops F on the lower side of the disk E curve and extend in a direction the reverse of the upper vanes or scoops G, as will be clear by reference to Figs. 2 and 3.

In the walls of the cylinder are formed two or more passages H, which may be closed to a greater or less extent by means of screws I. The cylinder B is closed at its lower end by a bottom plate K', preferably screwed into place, and at its upper end by a top plate K², preferably integral with the cylinder. These bottom and top plates are formed or provided, respectively, with radial stemming or damming ribs K and K³. (Best seen in Figs. 4 to 7, inclusive.) The ribs are each substantially triangular in cross-section, and one face of each rib is vertical and at right angles to the plate, while the opposing face is inclined thereto. I have represented three radial ribs on each plate, but do not confine myself to this particular number. The ribs are so arranged that the stream of water entering below and flowing upward strikes against the vertical faces of the same both at the base and at the cover of the cylinder, while water flowing in the opposite direction—that is to say, from above downward—passes readily over the inclined surfaces. The water passing through the meter in the direction of the arrows upon the drawing off of such water enters by the lower passages, causes the vane-wheel to rotate by striking upon the lower set of scoops, flows through the middle portion upward, thereby loading the vane-wheel heavily, and passes out by way of the upper passages. Water flowing through in the opposite direction enters by the upper passages, strikes upon the upper set of scoops, and thus causes the vane-wheel to rotate backward, leaving the measuring vessel through the lower passages. As the water flowing back loads the vane-wheel, while the water flowing forward lightens it, if the indications exactly correspond with the amount of water flowing through in the forward direction they would be "slow" with respect to the quantity of water flowing back; but owing to the stemming-ribs having differently-inclined faces this difference is compensated for. During both a forward and a backward flow of water a portion of the same passes through the passages formed in the cylindrical walls of the measuring vessel, which passages form a kind of circular conduit, whereby a ready and exact means of gaging the meter independently of the various loads is afforded.

Having thus fully described my invention, what I desire to claim and secure by Letters Patent is—

1. The combination, in a water-meter of the inner, cylindrical measuring vessel having water-passages and top and bottom plates closing its ends and provided with radial stemming-ribs approximately triangular in cross-section, one face of each rib being vertical and the other inclined, and a rotary vane-wheel within the cylinder, substantially as and for the purpose described.

2. In a water-meter, the combination with the outer casing having an inlet and an outlet, and a frame or inner case in the upper part of said casing for containing a suitable register, of the cylindrical measuring vessel having upper and lower sets of lateral water-passages and top and bottom cover-plates provided with radial stemming-ribs triangular in cross-section, each rib having one face inclined and the opposing face at right angles to the plate, and a water-wheel composed of a disk having curved vanes on its upper and lower sides, substantially as and for the purposes described.

In testimony whereof I have signed my name to this specification in the presence of two subscribing witnesses.

EMIL ZUMKELLER.

Witnesses:
MATTHIAS SCHRENMETZER,
JACOB ADRIAN.